United States Patent [19]

Coxon et al.

[11] 4,298,491

[45] Nov. 3, 1981

[54] PROCESS FOR MAKING DETERGENT COMPOSITIONS

[75] Inventors: Andrew C. Coxon, Wirral; David J. Edge, Chester; Mark L. L. Lapper, York, all of England

[73] Assignee: Lever Brothers Company, New York, N.Y.

[21] Appl. No.: 150,824

[22] Filed: May 19, 1980

[30] Foreign Application Priority Data

May 17, 1979 [GB] United Kingdom ............... 17226/79

[51] Int. Cl.$^3$ ...................... C09K 15/02; C09K 15/20; C11D 11/00; C11D 11/02
[52] U.S. Cl. ..................................... 252/95; 252/89.1; 252/133; 252/135; 252/174; 252/174.13; 252/174.21; 252/397; 252/403; 252/404; 252/407; 252/540; 252/559; 568/580; 568/581; 568/582
[58] Field of Search ....................... 568/580, 581, 582; 252/89.1, 133, 135, 174, 174.13, 174.21, 397, 403, 404, 407, 540, 559, 95

[56] References Cited

U.S. PATENT DOCUMENTS

| | | | |
|---|---|---|---|
| 3,324,078 | 6/1967 | Matsui | 568/581 |
| 3,403,107 | 9/1968 | Myerly | 252/524 |
| 3,558,263 | 1/1971 | Baitinger | 252/397 |
| 3,886,098 | 5/1975 | Disalvo | 252/540 |
| 4,006,110 | 2/1977 | Kenney | 252/540 |
| 4,126,586 | 11/1978 | Curtis | 252/524 |
| 4,155,882 | 5/1979 | Davies | 252/548 |

*Primary Examiner*—Dennis L. Albrecht

[57] ABSTRACT

The autoxidation of aqueous detergent slurries containing major quantities of nonionic surfactant during spray-drying is inhibited by the use of a charge-transfer agent. The charge-transfer agent may be a charge-transfer acceptor or a charge-transfer donor or a precursor of either of these. The agent may be present in an amount of from 0.05 to 2% by weight and the nonionic surfactant in an amount of 3% or more by weight based on the weight of the fully formulated detergent powder. The preferred charge-transfer agent is potassium iodide.

7 Claims, No Drawings

PROCESS FOR MAKING DETERGENT COMPOSITIONS

This invention relates to the inhibition of autoxidation of nonionic surfactants. In a narrower aspect, it relates to inhibition of autoxidation of nonionic surfactants during manufacture of detergent powder by spray-drying, and to the detergent powder produced by this process.

During a period of about six years we have filed a series of patent applications describing improvements in spray-drying processes for the production of detergent powders containing large amounts of nonionic surfactants. These patent applications are those in the series corresponding to British Patent Nos. 1,474,688, 1,506,392 and Patent Application Nos. 37649/74 and 5122/76. All of these describe the use of certain nitrogen-containing compounds as autoxidation inhibitors in the spray-drying process.

We have now discovered that charge-transfer agents, some of which are nitrogen compounds and some not, are capable of inhibiting autoxidation of nonionic surfactants.

Accordingly, in its broadest aspect, the invention provides a composition comprising a nonionic surfactant and a minor amount of a charge-transfer agent.

The term 'a charge-transfer agent' means a charge-transfer acceptor, a charge-transfer donor, a precursor for either of these, or a mixture of two or more of these.

Whilst, as stated above, some of the charge-transfer agents will be nitrogen compounds, it is not considered that any of the nitrogen compounds disclosed in the patents and applications referred to above operate as charge-transfer agents in the disclosed processes.

In a narrower aspect of the present invention there is provided a process of inhibiting autoxidation during spray-drying of aqueous detergent slurries containing more than 3% of a nonionic surfactant, which process comprises incorporating in the slurry from 0.05 to 2% of a charge-transfer agent, the percentages being based on the weight of the fully formulated powder produced.

In a second narrower aspect, the invention provides a detergent powder comprising 3% by weight or more of a nonionic surfactant and from 0.05 to 2% by weight of a charge-transfer agent, or a reaction product thereof.

The basic discovery that charge-transfer agents inhibit autoxidation of nonionic surfactants is applicable to other situations in which nonionic surfactants are used, apart from spray-drying. Thus, addition of minor proportions of charge-transfer agents to nonionic surfactants will combat autoxidation during storage, and during use, for example as emulsifiers and detergent surfactants, in acid cleaning of metals, and as oil well drilling fluids.

Examples of suitable charge-transfer acceptors are the following compounds:

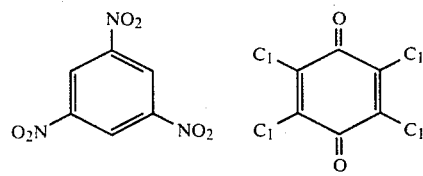

-continued

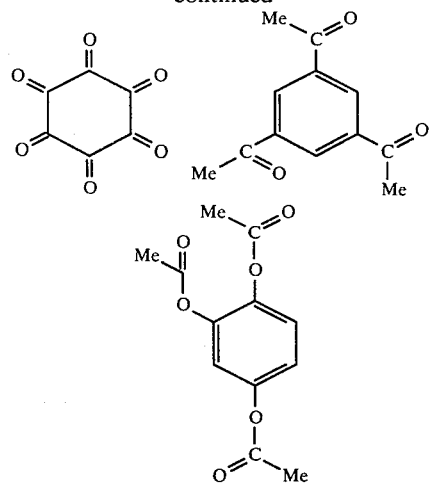

Examples of suitable charge-transfer donors are:

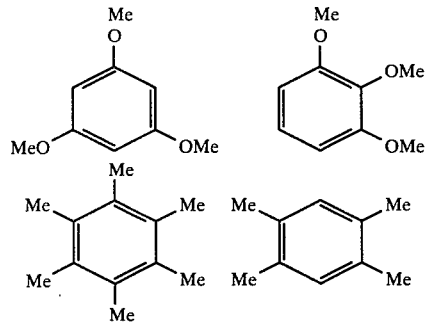

In addition, stannic chloride, silver perchlorate, iodine and sodium and potassium iodides as charge-transfer agents. The latter compounds are preferred, since not only do they produce a good autoxidation inhibiting effect, but they are relatively physiologically and environmentally acceptable and are colourless.

When the charge-transfer agent is incorporated into neat nonionic surfactant, then the amount used will be from 0.01 to 2% by weight, preferably 0.01 to 0.5% by weight, and when incorporated into a detergent slurry prior to spray-drying the amount will be 0.05 to 2% by weight, preferably 0.1 to 0.5% by weight based on the fully formulated detergent powder.

The charge-transfer agent is normally incorporated in the crutcher slurry either in solution or in suspension but may also be injected into a high pressure line carrying pressurised slurry to the spraying nozzles of a spray-drying tower.

If nonionic surfactant is being supplied to the spray-drying tower in that way, then the charge-transfer agent can be dissolved or dispersed in the surfactant and injected at the same time.

The amount of nonionic surfactant present in the slurry will be sufficient to provide from 3 to 20% by weight in the final powder. When all of the nonionic surfactant required in the spray-dried powder is incorporated into the slurry, then that will contain 3 to 20% by weight (based on the final powder) of nonionic surfactant. When part of the required nonionic surfactant is incorporated by another method, such as by spraying onto the spray-dried powder, or by using a preformed adjunct, then the slurry will contain 3 to 12% of nonionic surfactant based on the final powder.

The process of the invention is applicable not only to detergent slurries in which the surfactant is nonionic, but also to those containing mixtures of nonionic surfactants with other surface active species. Examples of these are synthetic anionic detergents, salts of naturally occurring fatty acids (soaps), cationic and zwitterionic surfactants.

The invention is particularly applicable to the spray-drying of powders containing nonionic surfactants of the alkoxylated alcohol type although other nonionic surfactants which give powders susceptible to autoxidation will also exhibit the improvement.

The alcohols used can be primary or secondary alcohols containing straight or branched carbon chains. The number of carbon atoms will generally be from 7 to about 24, preferably from about 8 to 18 and most preferably from about 11 to 16. These alcohols may be the so-called synthetic alcohols made by the well known Ziegler or Oxo processes, or the so-called "natural alcohols" made by hydrogenation of fatty acid derivatives, for example tallow alcohol.

The alkoxylation reaction will be carried out by conventional means, generally using ethylene oxide or propylene oxide or both. The degree of ethoxylation can vary widely both from one hydrophobe to the other and even when using a single hydrophobe. Thus ethylene oxide chains containing as few as 1 and more than 20 ethylene oxide units are quite often found in nonionic surfactants and will be applicable here.

The choice of carbon chain length of the hydrophobe and the chain length of the hydrophobic alkoxy chain is largely determined by the detergent properties required of the hydrophobic part of the molecule and that of the hydrophilic part can be expressed numerically as the hydrophilic-lipophilic balance (HLB). A rough and ready way of determining the HLB of alcohol ethoxylate is to use the expression $$HLB = \frac{\text{Wt percentage of ethylene oxide}}{5}$$

Nonionic surfactants which are suitable for use in heavy duty fabric washing powders generally have an HLB in the range 9 to 16, although HLB's outside this range are not excluded.

An additional factor in the choice of nonionic surfactant is that the alcohols containing both short carbon and short ethoxylate chain lengths are relatively low boiling and can volatilise under the conditions prevailing in a spray-drying tower.

Preferred alcohol ethoxylates for use in this invention are derived from the following series:

Tergitols (Trade Mark) which are a series of ethoxylates of secondary alcohols sold by the Union Carbide Corporation, especially Tergitol 15-S-7, 15-S-9, 15-S-12 and 15-S-15 which are ethoxylates of a mixture of $C_{11-15}$ alcohols and Tergitols 45-S-7, 45-S-9, 45-S-12 and 45-S-15 which are ethoxylates of a mixture of $C_{14}$ and $C_{15}$ alcohols, the degree of ethoxylation being shown by the postscript.

Ethoxylates of primary alcohols made by the Oxo process and containing about 20% of alpha-branched material sold by Shell Chemicals Ltd and Shell Chemicals Inc as Dobanols and Neodols (registered Trade Marks) respectively, especially Dobanol and Neodol 25-7, 25-9, 25-12 and 25-15, which are ethoxylates of a mixture of $C_{12}$-$C_{15}$ alcohols and Dobanol 45-7, 45-9, 25-12 and 25-15, which are ethoxylates of a mixture of $C_{14-15}$ alcohols.

Ukanils (Trade Mark) which are a series of ethoxylates of Oxo alcohols containing about 25% of alpha methyl branched and about 10% of ethyl branched material (Acropols (Trade Mark) manufactured by Ugine Kuhlman et Cie, especially Acropol 35-8, 35-9, 35-11 and 35-15, which are derived from a mixture of $C_{13}$-$C_{15}$ alcohols).

Synperonics (Trade Mark), a series of ethoxylates of alcohols containing 45–55% of alkyl branching, mostly methyl branching, sold by Imperial Chemical Industries Limited, especially those based on a $C_{13-15}$ mixture of alcohols and ethoxylated to 7,9,11 and 15 units of ethylene oxide.

Ethoxylates of primary Ziegler alcohols (Alfols (Trade Mark) derived from ethylene, manufactured by Conoco-Condea, especially Alfol 12/14-7, 12/14-9, 12/14-12, 12/14-15 and Alfol 14/12-7, 14/12-9, 14/12-12, 14/12-15, which are ethoxylates of mixtures of $C_{12}$ and $C_{14}$ alcohols).

Ethoxylates of primary Oxo alcohols containing about 60% branched material sometimes called Lials (Trade Mark) produced from olefins manufactured by Liquichimica.

Lastly, ethoxylates of natural alcohols, such as tallow alcohol can be used.

The required HLB can be achieved not only by selecting the carbon chain length of the hydrophobe and the length of the ethyleneoxy chain in a single or substantially single material (because of the nature of their process of production, all nonionic surfactants which are spoken of as if they were single substances are in fact mixtures). It can also be achieved by deliberately taking two "substances" of widely differing HLB's and mixing them. This approach is described in Netherlands Patent Application No. 7 413 522 and in Netherlands Patent Application No. 7 406 003. It is also possible to obtain the required HLB by "stripping" some chain lengths from a nonionic surfactant mixture as described in patent applications based on U.S. Ser. No. 453,462 and U.S. Pat. No. 3,682,849.

The detergency builders which may be used in the compositions of this invention may be any of the sequestrant or precipitant builders which have been suggested to replace phosphate builders, or they may be phosphate salts, or mixtures of any one of these, generally in amounts from 10 to 30% by weight in the case of phosphate builders and 10 to 35% by weight in the case of non-phosphate ones.

Examples of detergency builders which may be used are ortho-, pyro- and tripolyphosphates; aluminosilicates; carbonates, especially the sodium carbonate/calcium carbonate combination; polyphosphonates such as ethane-1-hydroxy-1,1-diphosphonate; amine carboxylates such as nitrilotriacetates and ethylene diamine tetra acetates; ether carboxylates such as oxydiacetates, oxydisuccinates, carboxymethyloxysuccinates and malonates; citrates; mellitates; and salts of polymeric carboxylic acids such as polymaleates, polyitaconates and polyacrylates. These salts will normally contain alkali metal or ammonium cations, preferably sodium.

Mixtures of sodium ortho- and tripolyphosphate are also suitable detergency builders, particularly mixtures in the ratio 10:1 to 1:5, preferably 5:1 to 1:1 tripolyphosphate to orthophosphate, in amounts of 10 to 30% by weight.

Other conventional components of detergent compositions may be present in conventional amounts. Examples of these include powder flow aids such as finely divided silicas and aluminosilicates, antiredeposition agents such as sodium carboxymethylcellulose, oxygen-releasing bleaching agents such as sodium perborate and sodium percarbonate, per-acid bleach precursors such as tetraacetylethylenediamine, chlorine-releasing bleaching agents such as trichloroisocyanuric acid and alkali metal salts of dichloroisocyanuric acid, fabric softening agents such as clays of the smectite and illite types, anti-ashing aids, starches, slurry stabilisers such as copolyethylene maleic anhydride and copolyvinylmethylether maleic anhydride, usually in salt form, inorganic salts such as sodium silicates and sodium sulphate, and usually present in very minor amounts, fluorescent agents, perfumes, enzymes such as proteases and amylases, germicides and colourants. The detergent compositions usually have an alkaline pH, generally in the region of pH 9–11, which is achieved by the presence of alkaline salts, especially sodium silicates such as the meta-, neutral or alkaline silicates, preferably at levels up to about 15% by weight.

The following Example illustrates the effect of a charge-transfer agent in inhibiting autoxidation of detergent compositions containing relatively high levels of nonionic surfactants.

Example 1

In this example, the time taken for a sample of detergent powder to autoxidise at a given temperature was measured by a modification of the method of P C Bowes and A Cameron described in J. Appl. Chem and Biotechnol, 1971. This method involves suspending cubic open-topped baskets of 10 cm size containing the powder in an oven set to the temperature required. The powder has a thermocouple embedded in it, close to the centre of the cube, connected to a chart recorder. When autoxidation sets in a rapid rise in temperature occurs.

Slurries were made-up and spray-dried to produce a powder having the following formulations:

|  | % by weight | | |
| --- | --- | --- | --- |
|  | A | B | C |
| Nonionic surfactant[1] | 14.0 | 14.0 | 14.0 |
| Sodium soap[2] | 1.0 | 1.0 | 1.0 |
| Sodium tripolyphosphate | 46.0 | 46.0 | 46.0 |
| Alkaline sodium silicate | 7.0 | 7.0 | 7.0 |
| Sodium sulphate | 13.0 | 13.0 | 13.0 |
| Sodium carboxymethylcellulose | 1.0 | 1.0 | 1.0 |
| Potassium iodide | — | 0.1 | 0.5 |
| Minors and moisture | Balance to 100 | | |

[1]The nonionic surfactant was "Synperonic 7" which has been described earlier.
[2]The sodium soap was "Pristerine 4916" (registered Trade Mark) available from Prices Chemicals Ltd., Bromborough, Wirral, Merseyside, England.

The time to autoxidation of the two powders was measured as described with the following results:

| Powder | Time to autoxidation (hrs) |
| --- | --- |
| A | 2½ ⎫ |
| B | 7½ ⎬ at 150° |
| C | 12½ ⎭ |

This demonstrates the superior inhibition of autoxidation which can be obtained by spray-drying detergent containing relatively high levels of nonionic surfactants in the presence of a potassium iodide charge transfer agent.

The following model experiments demonstrate the effect of various charge-transfer agents on autoxidation of nonionic surfactants.

EXAMPLE 2

Charge-transfer agents, in the amounts shown in the table, were added to a nonionic surfactant and placed in an open beaker. The beaker was then placed in an oven at the temperature shown and allowed to remain there for a period of time.

The extent of autoxidation was followed spectroscopically, the ratio $$\frac{\text{length of } 1750 \text{ cm}^{-1} \text{ peak}}{\text{length of } 1460 \text{ cm}^{-1} \text{ peak}}$$

being taken as proportional to the degree of autoxidation.

The results are shown in Table 1.

TABLE 1

| Charge Transfer Agent | Amount (%) | Nonionic Surfactant | Temp °C. | Absorption | Time |
| --- | --- | --- | --- | --- | --- |
| Nil | 0 | Synperonic 7[a] | 150 | 0.48 | 6½ hours |
| Iodine | 0.01 | Synperonic 7[a] | 150 | 0.04 | 6½ hours |
| Potassium Iodide | 0.1 | Synperonic 7[a] | 150 | 0.08 | 6½ hours |
| Nil | 0 | Dobanol 25 7EO[b] | 50 | 0.45 | 28 days |
| 1,2,3-trimethoxybenzene | 2 | Dobanol 25 7EO[b] | 50 | 0.10 | 28 days |
| Hexaketocyclohexane 8 H$_2$O | 2 | Dobanol 25 7EO[b] | 50 | 0.10 | 28 days |
| 1,2,4-triacetoxybenzene | 2 | Dobanol 25 7EO[b] | 50 | 0.33 | 28 days |

[a]Synperonic 7 is described on page 7
[b]Dobanol 25 7EO is described on page 7

It can be seen from the above experiments that incorporation of minor amounts of charge-transfer agent into nonionic surfactants has a marked effect in reducing the extent of autoxidation of nonionic surfactants.

What is claimed is:

1. In a process for the production of a detergent powder by spray-drying an aqueous slurry comprising 3% or more by weight of a nonionic surfactant, the improvement which comprises inhibiting autoxidation by incorporating from 0.05 to 2% by weight of a charge transfer agent selected from the group consisting of stannic chloride, silver perchlorate, and iodine the percentages being based on the fully formulated detergent powder.

2. A process in accordance with claim 1, wherein the charge-transfer agent is present in the slurry in an amount of from 0.1 to 0.5% by weight, based on the weight of the fully formulated detergent powder.

3. A process in accordance with claim 1, wherein the nonionic surfactant comprises a C$_7$ to C$_{24}$ primary or secondary alcohol ethoxylated with from 1 to 20 moles of ethylene oxide per mole of alcohol.

4. A process in accordance with claim 1 wherein the nonionic surfactant is incorporated into the powder partly by spray-drying an aqueous slurry containing the surfactant and partly by a method other than spray-drying.

5. A process in accordance with claim 4 wherein the aqueous slurry comprises from 3 to 12% by weight of nonionic surfactant, based on the weight of the fully formulated detergent powder.

6. A process in accordance with claim 1 wherein the aqueous slurry comprises from 3% to 20% by weight of nonionic surfactant, based on the weight of the fully formulated detergent powder.

7. In a process for the production of a detergent powder by spray-drying an aqueous slurry comprising 3% or more by weight of a nonionic surfactant, the improvement which comprises inhibiting autoxidation by incorporating from 0.05 to 2% by weight of a charge transfer agent selected from the group consisting of 1, 3, 5 trinitobenzene; tetrachlorobenzoquinone; 1, 3, 5 triacetobenzene, 1, 2, 4 triacetobenzene; 1, 3, 5 trimethoxybenzene; 1, 2, 3 trimethoxybenzene; hexamethyl benzene; 1, 2, 4, 5 tetramethyl benzene and hexaketocyclohexane, the percentages being based on the fully formulated detergent powder.

* * * * *

UNITED STATES PATENT AND TRADEMARK OFFICE
CERTIFICATE OF CORRECTION

PATENT NO. : 4,298,491
DATED : November 3, 1981
INVENTOR(S) : Coxon et al

It is certified that error appears in the above—identified patent and that said Letters Patent is hereby corrected as shown below:

Claim 7: "production of a detergent, 23 powder" should read -- production of a detergent powder --.

Signed and Sealed this

Sixteenth Day of February 1982

[SEAL]

Attest:

GERALD J. MOSSINGHOFF

Attesting Officer

Commissioner of Patents and Trademarks